United States Patent
Miyoshi

(10) Patent No.: US 9,036,918 B2
(45) Date of Patent: May 19, 2015

(54) IMAGE PROCESSING APPARATUS AND IMAGE PROCESSING METHOD

(75) Inventor: Hidenobu Miyoshi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 498 days.

(21) Appl. No.: 13/612,063

(22) Filed: Sep. 12, 2012

(65) Prior Publication Data

US 2013/0011072 A1 Jan. 10, 2013

Related U.S. Application Data

(63) Continuation of application No. PCT/JP2010/055712, filed on Mar. 30, 2010.

(51) Int. Cl.
*G06K 9/48* (2006.01)
*H04N 19/573* (2014.01)
*H04N 19/105* (2014.01)
*H04N 19/503* (2014.01)
*H04N 19/139* (2014.01)
*H04N 19/176* (2014.01)
(Continued)

(52) U.S. Cl.
CPC ........... *H04N 19/573* (2014.11); *H04N 19/105* (2014.11); *H04N 19/503* (2014.11); *H04N 19/139* (2014.11); *H04N 19/176* (2014.11); *H04N 19/103* (2014.11); *H04N 19/157* (2014.11); *H04N 19/16* (2014.11)

(58) Field of Classification Search
CPC . H04N 19/103; H04N 19/105; H04N 19/139; H04N 19/157; H04N 19/159; H04N 19/16; H04N 19/176; H04N 19/503; H04N 19/573
See application file for complete search history.

(56) References Cited

U.S. PATENT DOCUMENTS

2003/0086498 A1  5/2003  Lee et al.
2009/0060045 A1  3/2009  Tateno

FOREIGN PATENT DOCUMENTS

JP  2003-163894  6/2003
JP  2006-94454  4/2006
(Continued)

OTHER PUBLICATIONS

Wiegand et al., "Overview of the H.264/AVC Video Coding Standard", Jul. 2003, IEEE Transactions on Circuits and Systems for Video Technology, vol. 13, No. 7, p. 560-576.*

Schwarz et al., "Overview of the Scalable Video Coding Extension of the H.264/AVC Standard", Sep. 2007, IEEE Transactions on Circuits and Systems for Video Technology, vol. 17, No. 9. p. 1103-1120.*

(Continued)

*Primary Examiner* — Stephen R Koziol
*Assistant Examiner* — Timothy Choi
(74) *Attorney, Agent, or Firm* — Staas & Halsey LLP

(57) ABSTRACT

Whether a processing target block belongs to a quiescence area is determined based on a motion vector of an adjacent block whose encoding mode is determined to not be the intra-encoding mode and a reference index indicating a reference image of the adjacent block, whereby a reference index indicating a reference image of the processing target block is determined. If all the encoding modes of the adjacent blocks are the intra-encoding mode, an index number assigned to an image temporally closest and in a field different from a field to which the processing target block belongs is selected. If the processing target block belongs to a quiescence area, an index number assigned to an image temporally closest and in a same field as the processing target block is selected. If the processing target block belongs to a moving area, an index number of a reference image temporally closest is selected.

9 Claims, 11 Drawing Sheets

(51) Int. Cl.
*H04N 19/103* (2014.01)
*H04N 19/157* (2014.01)
*H04N 19/16* (2014.01)

(56) References Cited

FOREIGN PATENT DOCUMENTS

| | | |
|---|---|---|
| JP | 2006-295734 | 10/2006 |
| JP | 2008-11117 | 1/2008 |
| JP | 2009-55542 | 3/2009 |

OTHER PUBLICATIONS

Gao et al., "AVS Video Coding Standard", 2010, Intelligent Multimedia Communication: Techniques and Applications, vol. 280, p. 125-166.*

PCT International Preliminary Report on Patentability mailed Nov. 1, 2012 in corresponding International Application No. PCT/JP2010/055712.

International Search Report of Corresponding PCT Application PCT/JP2010/055712 mailed Jun. 22, 2010.

* cited by examiner

IMAGE PROCESSING APPARATUS AND IMAGE PROCESSING METHOD

CROSS REFERENCE TO RELATED APPLICATIONS

This application is a continuation application of International Application PCT/JP2010/055712, filed on Mar. 30, 2010 and designating the U.S., the entire contents of which are incorporated herein by reference.

FIELD

The embodiments discussed herein are related to an image processing apparatus and an image processing method.

BACKGROUND

Among image processing technologies for moving images, one transcodes first encoding information obtained by encoding image information with an inter-prediction (an inter-picture prediction) into second encoding information by using a motion vector of the first encoding information. In such a technology, when the motion vector of the first encoding information cannot be reused, for example, the second encoding information is generated by switching a prediction mode of an encoding target block that is to be encoded from the inter-prediction to an intra-prediction (an intra-picture prediction) based on a prediction mode of an adjacent block. Another of the technologies selects a prediction mode of an encoding-target macro block, from among the same prediction modes as those of an adjacent encoded macro block and a macro block in the last image corresponding to an adjacent macro block that is not encoded. Still another of the technologies estimates a motion vector for a frame or a field to be interpolated, by using a motion vector between frames or fields and generates a pixel of the frame or the field by using the estimated motion vector.

In a system for encoding a moving image by using inter-prediction, the following process is performed by a transmission-side apparatus that transmits moving image data. Motion vector data representing a motion from a past reference image to an encoding target image to be encoded is generated. A predicted image of the encoding target image is generated from the reference image by using the motion vector data. Differential data differing between the predicted image and the actual encoding target image is generated. The differential data and the motion vector data are then encoded and transmitted. At a reception-side apparatus, the decoding target image to be decoded is reproduced by using the received motion vector data and the differential data. The encoding and decoding processes in this case are performed in units of blocks obtained by dividing an original image of one frame into multiple blocks (macro blocks).

Among methods of displaying a moving image is an interlacing method in which an image of one frame is divided into a field constituted by odd-numbered scanning lines and a field constituted by even-numbered scanning lines and these fields are displayed in an alternating manner. In the interlacing method, there are multiple candidate reference images for an encoding target image, and a suitable reference image is selected from among the candidate reference images. The candidate reference images are assigned index numbers, respectively. In an image of one frame, a field located spatially on the upper side may be referred to as "top field", and a field located spatially on the lower side may be referred to as "bottom field".

FIG. 9 is an explanatory diagram of a procedure of assigning an index number to a candidate reference image. For example, as depicted in FIG. 9, when an image 1 of an encoding target block, which is denoted by Pt0, is a top field image, "0" is assigned as an index number refIdxL0 to a candidate reference image 2, which is closest and of the same field type, that is, the top field, and is denoted by Pt1. An index number of "1" is assigned to a candidate reference image 3, which is closest and of a different field type with respect to the image 1 of the encoding target block, that is, the bottom field, and is denoted by Pb1. The symbols of Ptn and Pbn indicate images of the top field and the bottom field, respectively. The images denoted by Ptn and the images denoted by Pbn are included in the same frame.

Fields located spatially on the same side, either upper or lower side, such as one top field and another top field, may be said to be "identical in parity", and fields located spatially on differing sides, such as a top field and a bottom field, may be said to "differ in parity". An index number of "2" is assigned to a candidate reference image 4, which is the next closest image identical in parity and is denoted by Pt2. An index number of "3" is assigned to a candidate reference image 5, which is the next closest image differing in parity and is denoted by Pb2. In this manner, the index numbers are alternately assigned to an image of the same parity and an image of a different parity, beginning with an image of the same parity and in ascending order of the distance from the image 1 of the encoding target block to the images assigned the index numbers. The same is true for a case where the image 1 of the encoding target block is an image of the bottom field.

When a moving image is encoded by using inter-prediction in the interlacing method, for example, as depicted in FIG. 9, multiple candidate reference images may exist for the image Pt0 of the encoding target block, such as the candidate reference images Pt1, Pb1, Pt2, and Pb2. In an actual encoding process, a suitable candidate reference image is selected from among the candidate reference images. Therefore, a reference index indicating the selected reference image is encoded together with the differential data and the motion vector data. On the other hand, an algorithm may be determined in advance such that a closest image identical in parity is set as the reference image. When an algorithm on an encoding side and an algorithm on a decoding side are this type of algorithm, the reference index is implicitly set to "0" on the decoding side even without any notification of the reference index from the encoding side to the decoding side. Therefore, as the encoding can be performed without including the reference index, the encoding efficiency is improved as compared to the case of including the reference index in the encoding.

In one of the standards of a moving-image encoding system, ITU-T H.264/ISO/IEC MPEG-4 AVC, a macro block referred to as "P8×8ref0" or "P_SKIP", which performs encoding without including any reference index, is provided. When encoding a moving image, since the compression ratio of the moving image data is increased, it is desired to select P8×8ref0 or P_SKIP as much as possible. Note that ITU-T stands for International Telecommunication Union Telecommunication Standardization Sector, ISO stands for International Organization for Standardization, IEC stands for International Electrotechnical Commission, MPEG-4 stands for Moving Picture Experts Group phase 4, and AVC stands for Advanced Video Coding. For examples, refer to Japanese Laid-Open Patent Publication Nos. 2006-295734, 2009-55542, and 2003-163894.

However, with the conventional encoding technology in the interlacing method, as described below, it is difficult to select a macro block type configured to perform encoding without including the reference index, which causes an issue that the encoding efficiency is low. In most cases of still scenes, the image of the encoding target block is the same as the closest image identical in parity in both the top field and the bottom field. Therefore, the closest image identical in parity is likely to be selected as the reference image. When the closest image identical in parity is selected, as the reference index is "0", P8×8ref0 or P_SKIP mentioned above tends to be selected.

On the other hand, in most cases of scenes with motion, the image of the encoding target block often becomes different from the closest image identical in parity, in both the top field and the bottom field. As depicted in FIG. 10, this feature is conspicuous when a Group Of Pictures (GOP) structure is an I picture structure (not depicted in FIG. 10) or an IBBP structure in which two B pictures are sandwiched by two P pictures. In a motion compensating prediction, an image of the same picture type as the image of the encoding target block is employed as the reference image.

Therefore, when an image 11 of the encoding target block is an image Pb0 of the P picture in the bottom field, an image of the P picture closest to the image Pb0 in the bottom field is an image 12 denoted by Pb1. As the image Pb1 is apart from the image Pb0 by a time corresponding to a six-field period, a picture is likely to change greatly while making a transition from the image Pb1 to the image Pb0.

Meanwhile, a closest image 13 of the P picture in the top field, which is denoted by Pt0, is apart from the image Pb0 by only a time corresponding to a one-field period. Therefore, a change of a picture in this case is smaller than the mentioned case above, where the image Pb1 is apart from the image Pb0 by the time corresponding to a six-field period. Although it is not the same as the example of the image in the bottom field, even when the image of the encoding target block is an image in the top field, the closest image differing in parity has a time by which the image is apart from the image of the encoding target block shorter than that of the closest image identical in parity. Therefore, in the case of the scenes with motion, selection of the closest image differing in parity as the reference image provides a high possibility of improving the accuracy of the prediction, the closest image differing in parity is likely to be selected as the reference image. In this case, because the reference index is "1", P8×8ref0 or P_SKIP mentioned above is not selected.

The problem described above not only occurs in a case of a scene without motion and a scene with motion, but also occurs in a case of an area without motion (a quiescence area) and an area with motion (a moving area) in a picture in the same manner. That is, as depicted in FIG. 11, in a quiescence area 21, the closest image identical in parity is likely to be selected as the reference image, and in a moving area 22, the closest image differing in parity is likely to be selected as the reference image. Therefore, in the moving area 22, P8×8ref0 or P_SKIP mentioned above is not selected. In this manner, in the conventional encoding technology, as the macro block type configured to perform encoding without including the reference index is hardly selected, the encoding efficiency decreases.

SUMMARY

According to an aspect of an embodiment, an image processing apparatus divides a frame into multiple fields each displayed at a different timing, divides an image of each field into multiple blocks, and performs motion compensating prediction based on a reference image selected for each block and from multiple candidate reference images that are past reference images and a motion vector with respect to the reference image. The image processing apparatus includes a processor that is configured to determine whether all encoding modes of multiple adjacent blocks adjacent to a processing target block to be processed are an intra-encoding mode; determine upon determining that the encoding mode of at least one of the adjacent blocks is not the intra-encoding mode, whether the processing target block belongs to a quiescence area or a moving area, based on a motion vector of the adjacent block for which the encoding mode has been determined to not be the intra-encoding mode and a reference index indicating a reference image of the adjacent block for which the encoding mode has been determined to not be the intra-encoding mode; and select upon determining that all the encoding modes of the adjacent blocks are the intra-encoding mode, an index number assigned to an image that is temporally closest and in a field different from a field to which the processing target block belongs, select upon determining that the processing target block belongs to a quiescence area, an index number assigned to an image that is temporally closest and in a same field as the field to which the processing target block belongs, select upon determining that the processing target block belongs to a moving area and from among reference indexes indicating reference images of the adjacent blocks for which the encoding modes have been determined to not be the intra-encoding mode, an index number of a reference image that is temporally closest, and determine the selected index number as a reference index indicating a reference image of the processing target block.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of an image processing apparatus and an image processing method according to the present invention will be explained below in detail with reference to the accompanying drawings. The present invention is not limited to the embodiments. The image processing apparatus and the image processing method according to the present invention determines a reference index indicating a reference image of a processing target block that is to be processed, based on an encoding mode of an adjacent block that is adjacent to the processing target block, a reference index indicating a reference image of the adjacent block, and a motion vector of the adjacent block with respect to the reference image of the adjacent block. In the embodiments, a frame is divided into multiple fields each displayed at a different timing, for example, a top field and a bottom field. The image processing apparatus performs a motion compensating prediction for each block, based on a reference image selected from among multiple candidate reference images that are past images and a motion vector with respect to the reference image.

Figure 1:
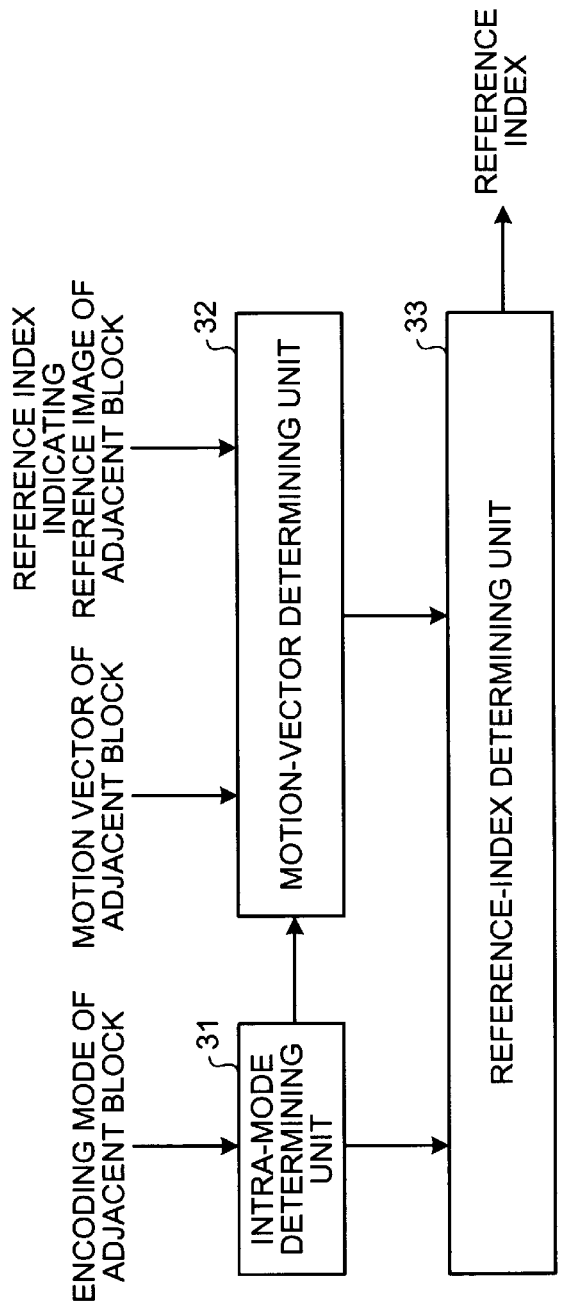
FIG. 1 is a block diagram of an image processing apparatus according to a first embodiment.

FIG. 1 is a block diagram of an image processing apparatus according to a first embodiment. As depicted in FIG. 1, the image processing apparatus according to the first embodiment includes an intra-mode determining unit 31, a motion-vector determining unit 32, and a reference-index determining unit 33. The intra-mode determining unit 31, the motion-vector determining unit 32, and the reference-index determining unit 33 are implemented by, for example, a processor executing a program for causing the processor to execute an image processing method (described later). Alternatively, these units may be implemented by a hardware configuration. The intra-mode determining unit 31 determines whether all encoding modes of multiple adjacent blocks adjacent to a processing target block are an intra-encoding mode.

The motion-vector determining unit 32 determines whether the processing target block belongs to a quiescence area or a moving area, if the intra-mode determining unit 31 determines that the encoding mode of at least one of the adjacent blocks is not the intra-encoding mode. The motion-vector determining unit 32 performs the determination based on the motion vector of the adjacent block for which the intra-mode determining unit 31 has determined that the encoding mode is not the intra-encoding mode and a reference index indicating a reference image of the adjacent block for which the intra-mode determining unit 31 has determined that the encoding mode is not the intra-encoding mode.

The reference-index determining unit 33 selects an index number assigned to the closest image differing in parity from the processing target block, if the intra-mode determining unit 31 determines that all the encoding modes of the adjacent blocks are the intra-encoding mode. The reference-index determining unit 33 selects an index number assigned to the closest image identical in parity to the processing target block, if the motion-vector determining unit 32 determines that the processing target block belongs to the quiescence area. The reference-index determining unit 33 selects an index number of the closest reference image among reference indexes indicating the adjacent blocks for which the intra-mode determining unit 31 has determined that the encoding modes are not the intra-encoding mode, if the motion-vector determining unit 32 determines that the processing target block belongs to the moving area. The reference-index determining unit 33 then determines the selected index number as a reference index indicating a reference image of the processing target block.

Figure 2:
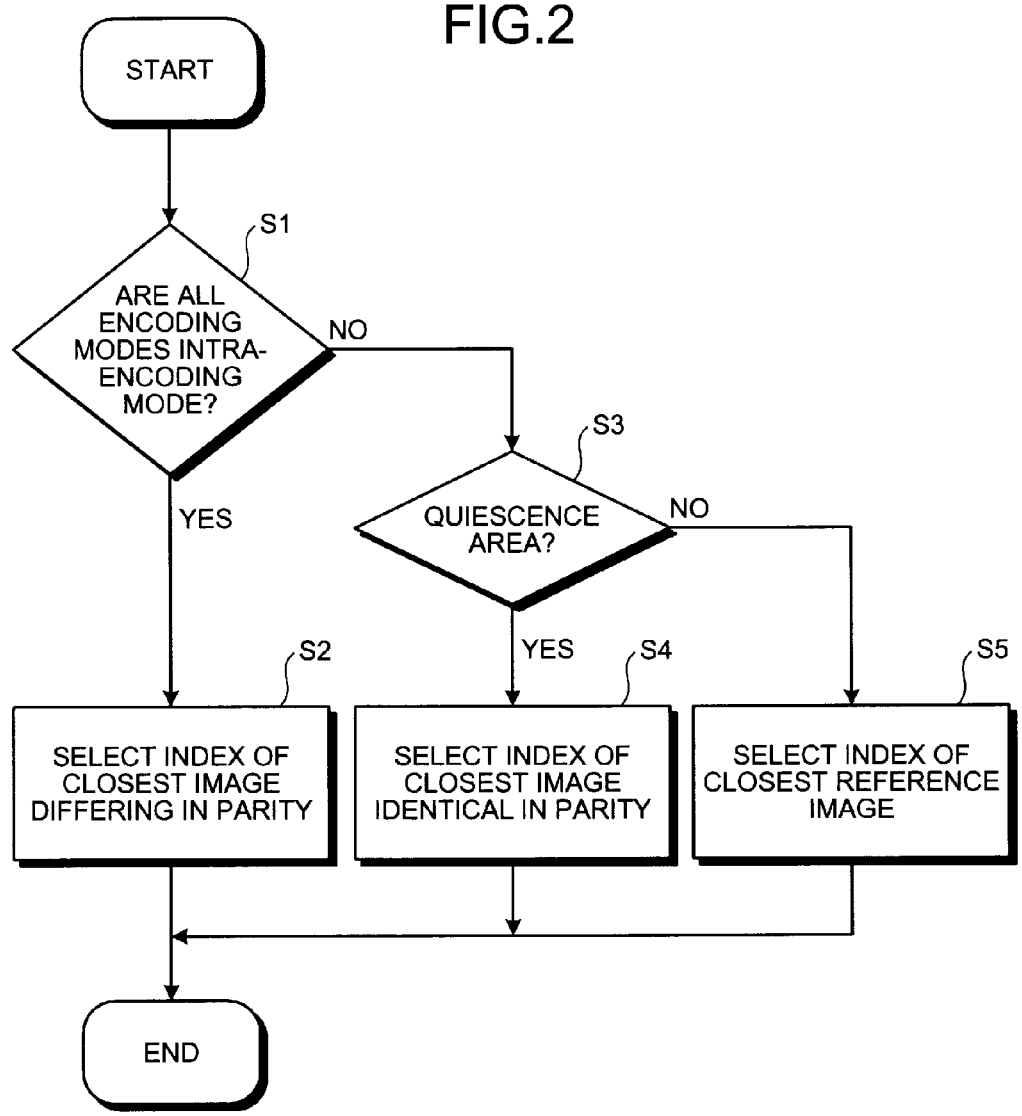
FIG. 2 is a flowchart depicting an image processing method according to the first embodiment.

FIG. 2 is a flowchart depicting an image processing method according to the first embodiment. As depicted in FIG. 2, when image processing for a processing target block is started, the intra-mode determining unit 31 determines whether all encoding modes of the adjacent blocks are an intra-encoding mode (step S1). If all the encoding modes of the adjacent blocks are determined to be the intra-encoding mode (step S1: YES), the reference-index determining unit 33 selects an index number assigned to the closest image differing in parity, as the reference index indicating the reference image of the processing target block (step S2). With this operation, a series of processes for the processing target block is completed.

If the encoding mode of at least one of the adjacent blocks is determined to not be the intra-encoding mode (step S1: NO), the motion-vector determining unit 32 determines whether the processing target block belongs to a quiescence area (step S3). The motion-vector determining unit 32 performs the determination based on the motion vector of the adjacent block for which the intra-mode determining unit 31 has determined that the encoding mode is not the intra-encoding mode and a reference index indicating a reference image of the adjacent block for which the intra-mode determining unit 31 has determined that the encoding mode is not the intra-encoding mode.

If the processing target block is determined to belong to a quiescence area (step S3: YES), the reference-index determining unit 33 selects an index number assigned to the closest image identical in parity, as the reference index indicating the reference image of the processing target block (step S4). With this operation, a series of processes for the processing target block is completed.

Meanwhile, if the processing target block is determined to belong to a moving area (step S3: NO), the reference-index determining unit 33 selects an index number assigned to a reference image of the adjacent block for which the intra-mode determining unit 31 has determined that the encoding mode is not the intra-encoding mode, as the reference index indicating the reference image of the processing target block (step S5). If there are multiple adjacent blocks for which the intra-mode determining unit 31 has determined that the encoding mode is not the intra-encoding mode, the reference-index determining unit 33 selects an index number of the closest reference image among reference images of the adjacent blocks. With this operation, a series of processes for the processing target block is completed. The processes described above are performed for all processing target blocks.

According to the first embodiment, the reference index of the processing target block is determined based on the encoding mode of an adjacent block at the time of encoding, the motion vector of the adjacent block, and the reference index indicating the reference image of the adjacent block. Therefore, by determining the reference index of the processing target block in the same manner at the time of decoding, the same reference index is determined for the same processing target block on the encoding side and on the decoding side. This enables the decoding side to perform decoding without any notification of the reference index from the encoding side. That is, the processing target block can be encoded without including the reference index on the encoding side and can be decoded on the decoding side. In addition, even when the reference index is not "0", since a suitable reference index is determined according to the adjacent block, it is possible to encode more blocks without including the reference index than a case where the encoding of the reference index can be omitted only when the reference index is "0".

In a second embodiment, the image processing apparatus and the image processing method according to the first embodiment are applied to an encoding apparatus and an encoding method for a moving image. A moving-image encoding system to which the second embodiment can be applied includes ITU-T H.264/ISO/IEC MPEG-4AVC or ISO/IEC MPEG-2/MPEG-4, for example. MPEG-2 stands for Moving Picture Experts Group phase 2.

Figure 3:
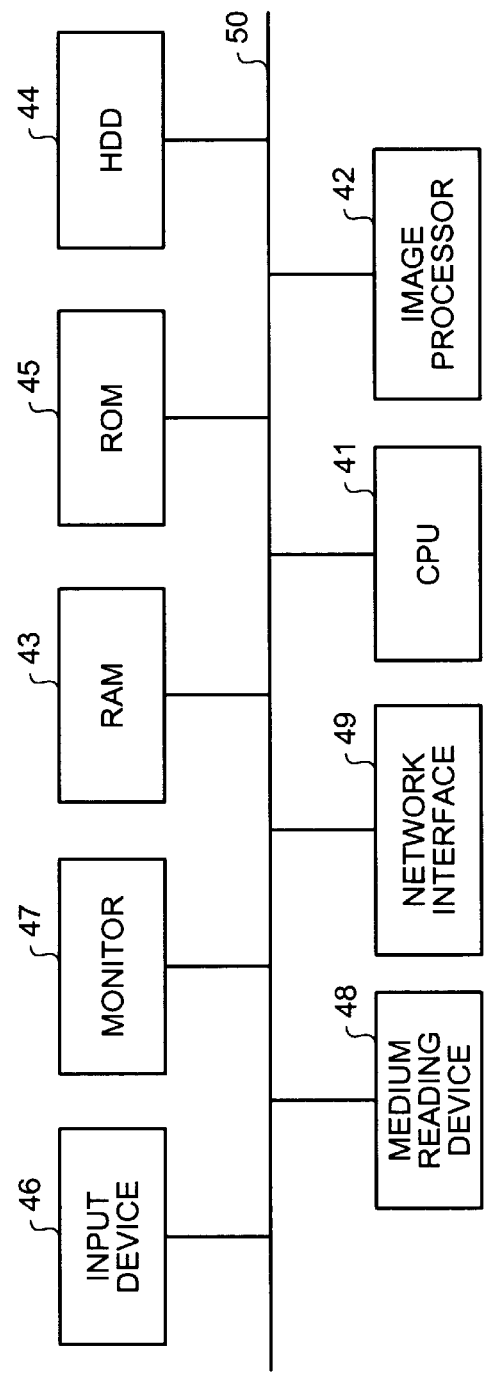
FIG. 3 is a block diagram depicting a hardware configuration of an encoding apparatus according to a second embodiment.

FIG. 3 is a block diagram depicting a hardware configuration of an encoding apparatus according to the second embodiment. As depicted in FIG. 3, for example, the encoding apparatus includes a central processing unit (CPU) 41, an image processor 42, random access memory (RAM) 43, a hard disk drive (HDD) 44, read-only memory (ROM) 45, an input device 46, a monitor 47, a medium reading device 48, and a network interface 49, respectively connected by a bus 50.

The HDD 44 stores an image processing program and moving image data in a hard disk incorporated therein. The image processing program is a program for processing the moving image data, and is installed in the hard disk, for example, by being read from a removable recording medium by the medium reading device 48. The moving image data includes, for example, data read from a removable recording medium by the medium reading device 48, data received from a network via the network interface 49, and data of received television broadcast.

The RAM 43 is used as a work area of the CPU 41. The RAM 43 stores the moving image data read from the HDD 44. The RAM 43 further stores image processing results obtained by the image processor 42. The image processor 42 reads the image processing program from the HDD 44, performs image processing and further performs processing such as encoding and decoding of the moving image data read from the RAM 43. The CPU 41 controls the overall operation of the encoding apparatus. The encoding process according to the second embodiment is implemented by the image processor 42 performing the image processing.

The ROM 45 stores a program such as a boot program. For example, the input device 46 includes a keyboard, a touch-panel type input pad, a pointing device such as a mouse, a switch or a button of a control device such as a remote controller. The monitor 47 is a device for displaying a moving image or data and may be a cathode ray tube (CRT) display, a thin film transistor (TFT) liquid crystal display, etc. The medium reading device 48 controls the reading of data including the moving image data from a removable recording medium such as a digital versatile disk (DVD) and a memory card.

The network interface 49 is connected to a network such as the Internet via a communication line, and controls the reception and the transmission of data including the moving image data between the encoding apparatus and other apparatuses connected to the network. The network interface 49 includes a modem and a local area network (LAN) adaptor. When the encoding apparatus is configured to receive a television broadcast, the encoding apparatus further includes an interface (not depicted) configured to be connected to an antenna line.

Figure 4:
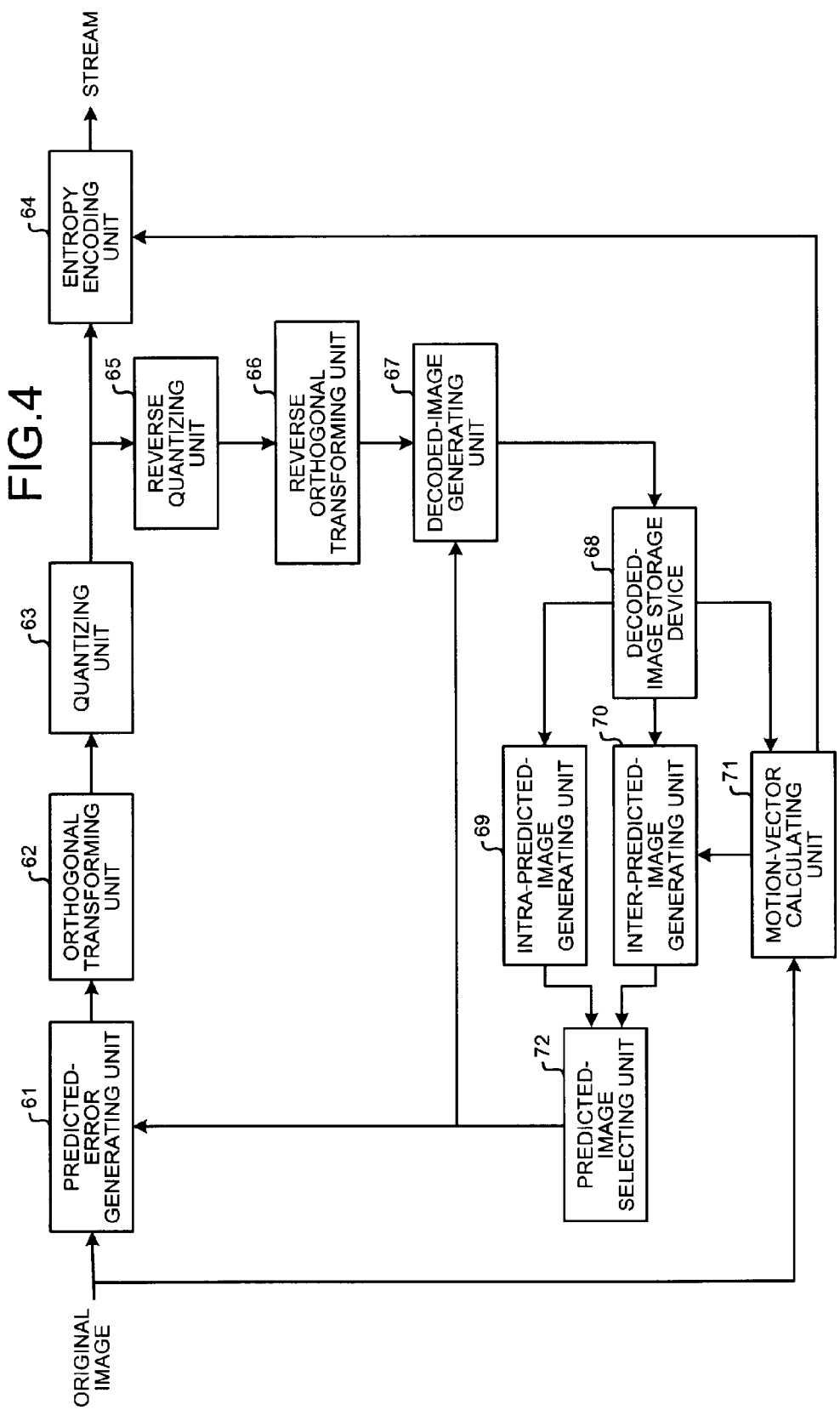
FIG. 4 is a block diagram depicting a functional configuration of the encoding apparatus according to the second embodiment.

FIG. 4 is a block diagram depicting a functional configuration of the encoding apparatus according to the second embodiment. As depicted in FIG. 4, the encoding apparatus includes a predicted-error generating unit 61, an orthogonal transforming unit 62, a quantizing unit 63, and an entropy encoding unit 64, as an encoding unit. Data of an original image input to the encoding apparatus is divided into, for example, macro block data of 16×16 pixels for each encoding target field to be encoded. The encoding process is performed in units of macro blocks. Therefore, in the second embodiment, the encoding target block and the adjacent block according to the first embodiment correspond to an encoding-target macro block and an adjacent macro block, respectively.

Data of a current encoding-target macro block is input to the predicted-error generating unit 61. The predicted-error generating unit 61 generates a predicted-error signal by obtaining, for example, a difference between the data of the current encoding-target macro block and data of a motion-compensated reference image from a predicted-image selecting unit 72 (described later). The motion-compensated reference image is generated by an inter-predicted-image generating unit 70 (described later) performing motion compensation with respect to a past reference image.

The orthogonal transforming unit 62 performs an orthogonal transform process with respect to an output signal of the predicted-error generating unit 61, and generates signals separated into frequency components of a lateral direction and a longitudinal direction. The quantizing unit 63 performs a quantization process with respect to an output signal of the orthogonal transforming unit 62 and thus, performs encoding to reduce an encoding amount of the predicted-error signal. The entropy encoding unit 64 encodes an output signal of the quantizing unit 63 and the motion vector by assigning a variable-length code according to an appearance frequency of a symbol, and outputs a result of the encoding as a bit stream. The motion vector is supplied from a motion-vector calculating unit 71 (described later).

The encoding apparatus further includes an inverse quantizing unit 65, an inverse orthogonal transforming unit 66, a decoded-image generating unit 67, and a decoded-image storage device 68. The inverse quantizing unit 65 performs an inverse quantization process with respect to the output signal of the quantizing unit 63. The inverse orthogonal transforming unit 66 performs an inverse orthogonal transform process with respect to an output signal of the inverse quantizing unit 65. By performing a decoding process by the inverse quantizing unit 65 and the inverse orthogonal transforming unit 66 in the above manner, a signal equivalent to a predicted-error signal before the encoding can be obtained. That is, the predicted-error signal before the encoding is substantially reproduced.

The decoded-image generating unit 67 reproduces predicted data of the current encoding-target macro block by, for example, adding the data of the motion-compensated reference image from the predicted-image selecting unit 72 (described later). The decoded-image storage device 68 stores therein the predicted data of the current encoding-target macro block reproduced by the decoded-image generating unit 67. The data of the macro block stored in the decoded-image storage device 68 is used as a reference image for a subsequent encoding process.

The encoding apparatus further includes an intra-predicted-image generating unit 69, the inter-predicted-image generating unit 70 as a predicted-image generating unit, the motion-vector calculating unit 71, and the predicted-image selecting unit 72. The intra-predicted-image generating unit 69 generates a predicted image by using an encoded pixel located around the encoding-target macro block, in the same field as the field to which the encoding-target macro block belongs. The inter-predicted-image generating unit 70 generates the data of the motion-compensated reference image by performing motion compensation on the data of the reference image from the decoded-image storage device 68 by using the motion vector. The data of the reference image is read from the decoded-image storage device 68 based on a reference index determined by a method of determining the reference index (described later).

The motion-vector calculating unit 71 obtains a motion vector indicating a spatial deviation between the data of the current encoding-target macro block and the data of the reference image from the decoded-image storage device 68. The predicted-image selecting unit 72 selects the output data of the intra-predicted-image generating unit 69 or the output data of the inter-predicted-image generating unit 70. For example, the decoded-image storage device 68 includes a frame memory and is implemented by, for example, the RAM 43 in the hardware configuration depicted in FIG. 3. Other constituent elements of the encoding apparatus except for the decoded-image storage device 68 are implemented by, for example, the image processor 42 reading the image processing program from the HDD 44 and performing the image processing in the hardware configuration depicted in FIG. 3.

Figure 5:
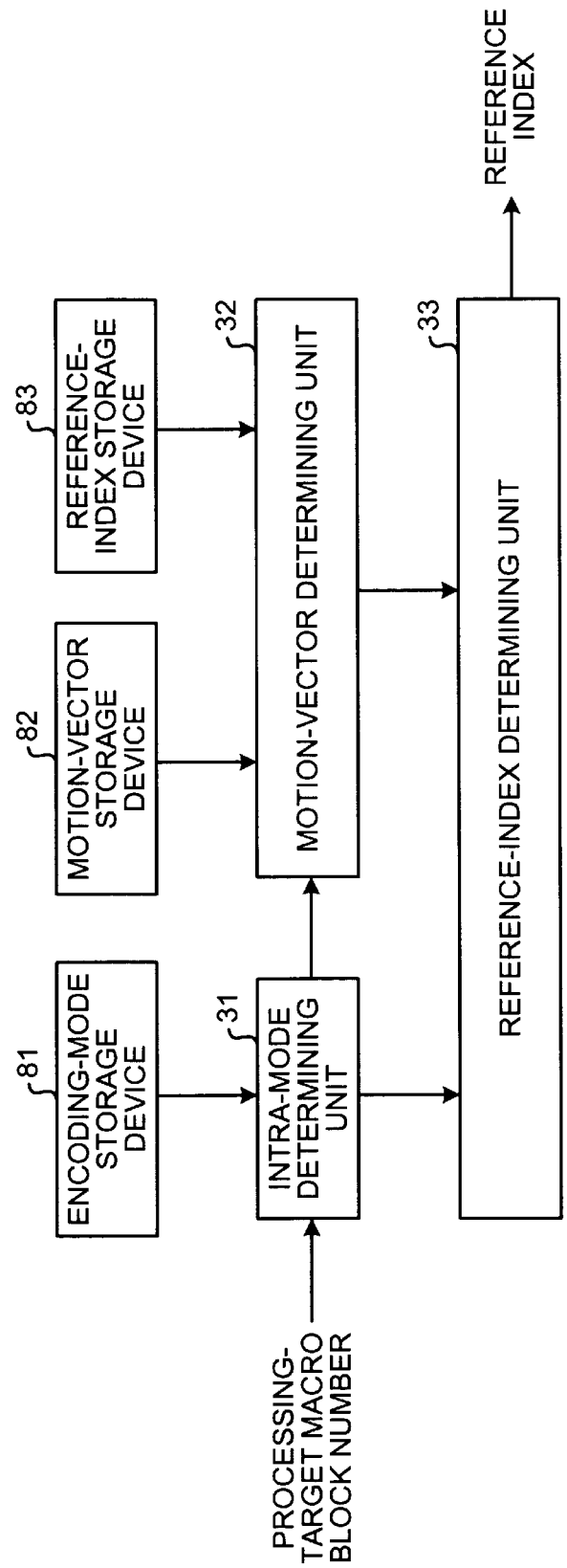
FIG. 5 is a block diagram of the image processing apparatus according to the second embodiment.

FIG. 5 is a block diagram of the image processing apparatus according to the second embodiment. As depicted in FIG. 5, the image processing apparatus according to the second embodiment includes, in addition to the configuration of the image processing apparatus according to the first embodiment, an encoding-mode storage device 81, a motion-vector storage device 82, and a reference-index storage device 83. For example, this image processing apparatus is included in the motion-vector calculating unit 71, in the inter-predicted-image generating unit 70, or both. The encoding-mode storage device 81, the motion-vector storage device 82, and the reference-index storage device 83 are implemented by, for example, the RAM 43 in the hardware configuration depicted in FIG. 3.

The encoding-mode storage device 81 stores therein the encoding mode of an encoded adjacent macro block adjacent to the encoding-target macro block. The encoding modes include an intra-encoding mode and an inter-encoding mode. When a predicted image of an adjacent macro block is generated by intra-prediction, the intra-encoding mode is stored to the encoding-mode storage device 81. Meanwhile, when the predicted image of the adjacent macro block is generated by the inter-prediction, the inter-encoding mode is stored to the encoding-mode storage device 81.

The motion-vector storage device 82 stores therein a motion vector of an adjacent macro block in the inter-encoding mode. The motion-vector storage device 82 may store the longitudinal direction component of the motion vector of the adjacent macro block or both the longitudinal direction component and the lateral direction component of the motion vector.

The reference-index storage device 83 stores therein a reference index indicating a reference image of the adjacent macro block in the inter-encoding mode. When there are multiple adjacent macro blocks in the inter-encoding mode, e.g., three adjacent macro blocks including adjacent macro blocks A, B, and C (see FIG. 6), each of the adjacent macro blocks A, B, and C has a reference image. In this case, the reference-index storage device 83 may store among three reference indexes respectively indicating the three reference image, the reference index indicating the reference image temporally closest to the corresponding adjacent macro images.

The intra-mode determining unit 31 recognizes the adjacent macro blocks adjacent to the encoding-target macro block based on the number of the encoding-target macro block. The intra-mode determining unit 31 determines whether all encoding modes of the adjacent blocks are the intra-encoding mode, based on the encoding mode stored in the encoding-mode storage device 81.

The motion-vector determining unit 32 determines whether the processing-target macro block belongs to a quiescence area or a moving area, based on the motion vector stored in the motion-vector storage device 82 and the reference index stored in the reference-index storage device 83. Criteria for the determination includes, for example, for all the adjacent macro blocks in the inter-encoding mode, whether conditions (1) and (2) are satisfied.

The reference index indicating the reference image is "0". (1)

The motion vector is "0" or a small value that can be regarded as "0". (2)

When all of the adjacent macro blocks of the inter-encoding mode satisfies the conditions of (1) and (2), the motion-vector determining unit 32 determines that the processing-target macro block belongs to the quiescence area. If this is not the case, the motion-vector determining unit 32 determines that the processing-target macro block belongs to the moving area. Here, regarding the motion vector, the determination may be performed based on the longitudinal direction component or both the longitudinal direction component and the lateral direction component.

In a boundary portion of a picture or a boundary portion of a divided slice, information of the encoding mode, the motion vector, and the reference index may not exist for all adjacent macro blocks. When there is no information on all the adjacent macro blocks, the motion-vector determining unit 32 may determine that the processing-target macro block belongs to the quiescence area. The reference-index determining unit 33 performs the same process as that described in the first embodiment.

Figure 6:
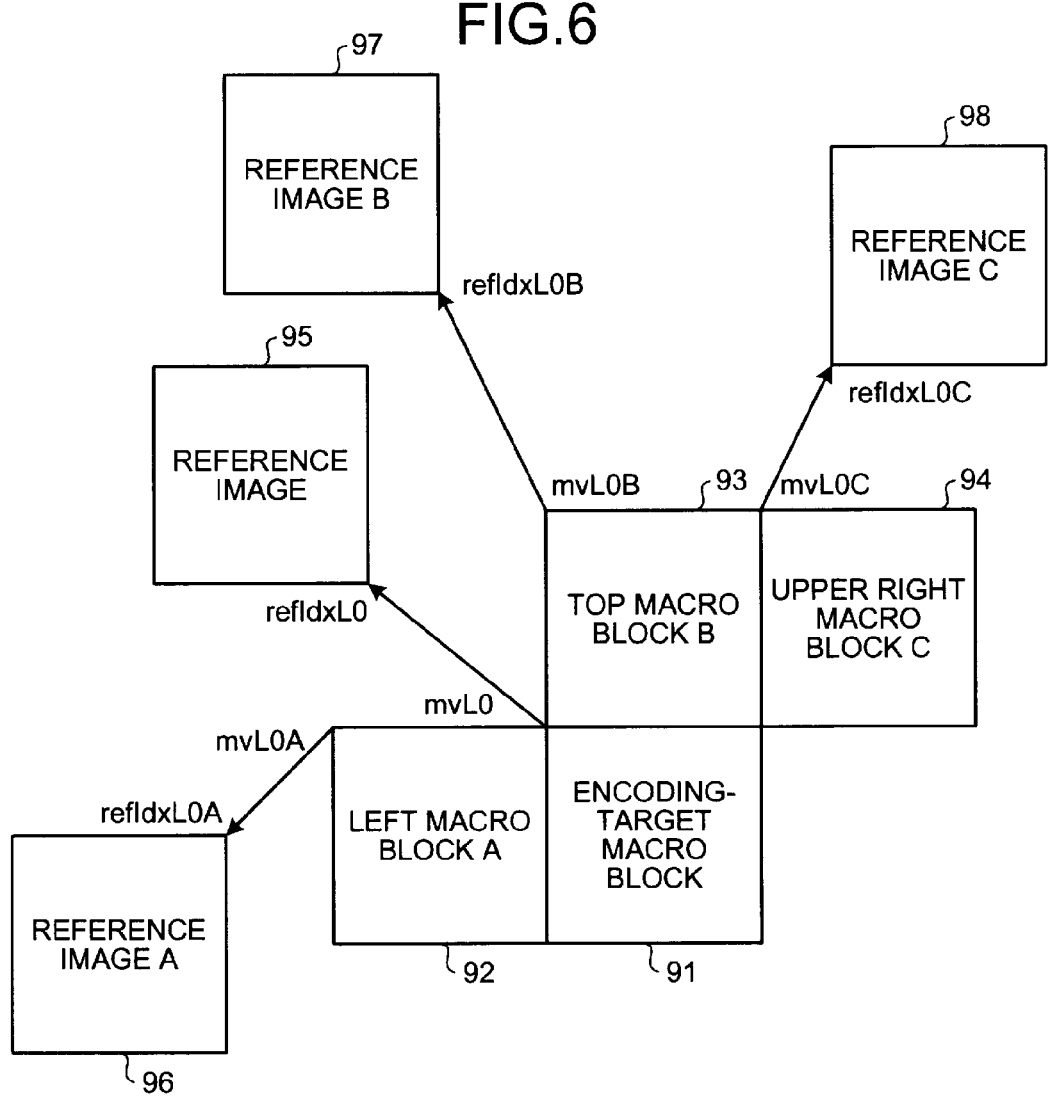
FIG. 6 is an explanatory diagram of the relationships among an encoding-target macro block, an adjacent macro block, and a reference image.

FIG. 6 is an explanatory diagram of the relationships among an encoding-target macro block, an adjacent macro block, and a reference image. In the example depicted in FIG. 6, an encoded left macro block A 92 on the left side, an encoded top macro block B 93 on the upper side, and an encoded upper right macro block C 94 are the adjacent macro blocks of an encoding-target macro block 91. The adjacent macro blocks are not limited to these three adjacent macro blocks A, B, and C and can be surrounding encoded macro blocks. A reference index indicating a reference image 95 to be obtained for the encoding-target macro block 91 is set to refIdxL0.

Figure 9:
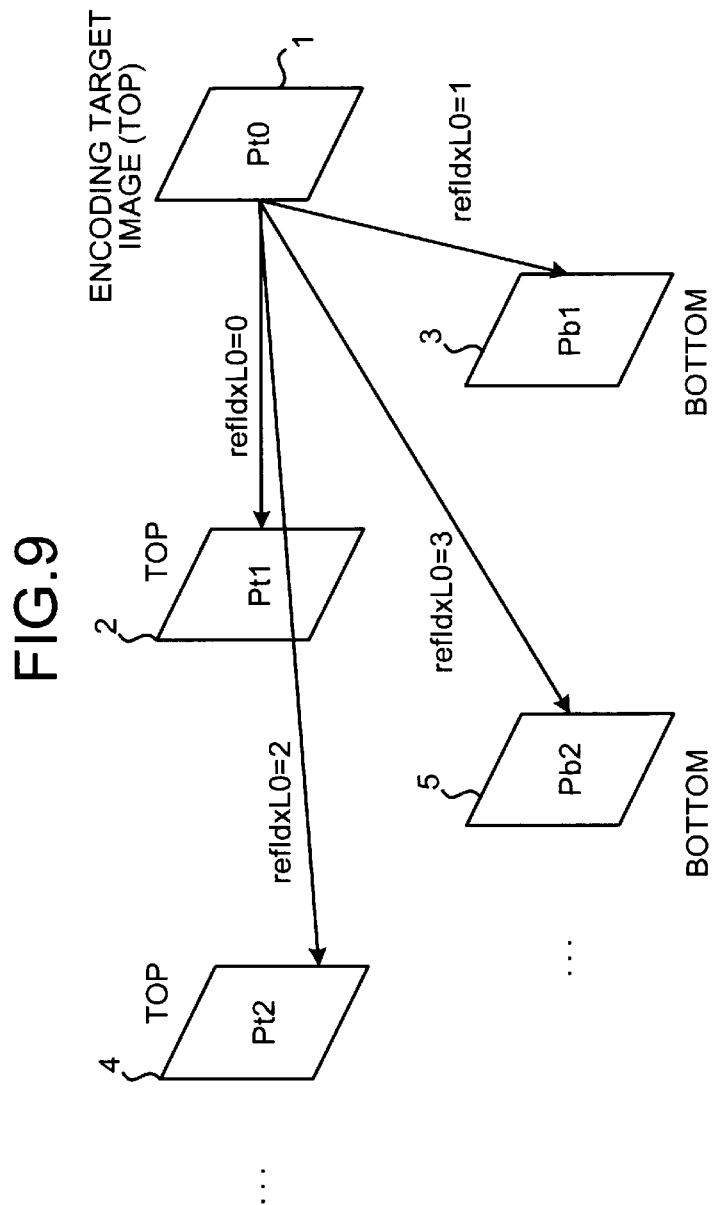
FIG. 9 is an explanatory diagram of a procedure of assigning an index number to a candidate reference image.
Figure 10:
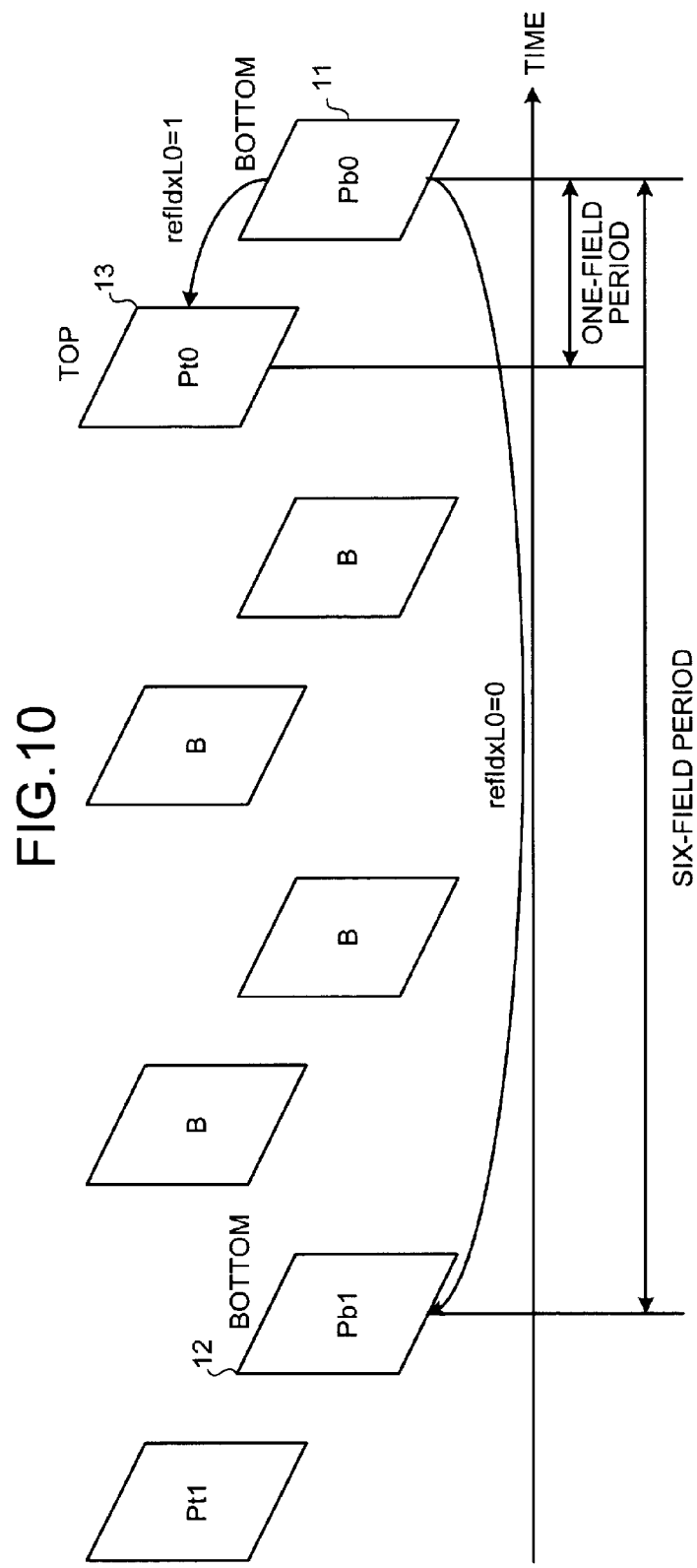
FIG. 10 is an explanatory diagram of an example of selection of a reference image in the IBBP structure.
Figure 11:
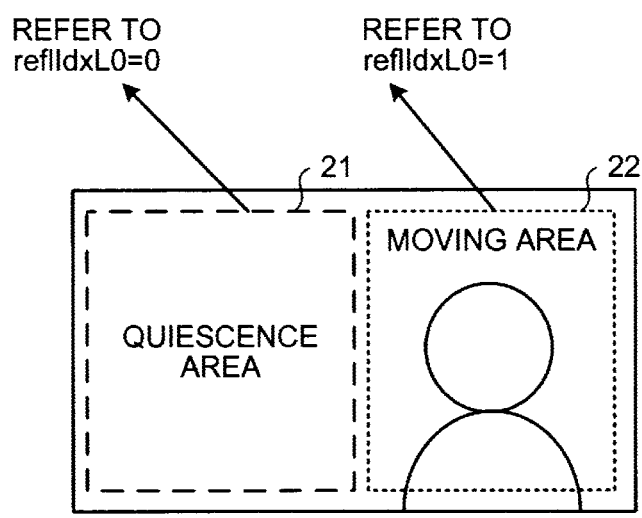
FIG. 11 is an explanatory diagram of an example of selection of a reference image for a quiescent area and a moving area.

Regarding the left macro block A 92, a reference index indicating a reference image A 96 is set to refIdxL0 and a motion vector is set to mvL0A. The lateral direction component and the longitudinal direction component of the motion vector mvL0A are set to mvL0A_x and mvL0A_y, respectively. Regarding the upper macro block B 93, a reference index indicating a reference image B 97 is set to refIdxL0B and a motion vector is set to mvL0B. The lateral direction component and the longitudinal direction component of the motion vector mvL0B are set to mvL0B_x and mvL0B_y, respectively. Regarding the right macro block C 94, a reference index indicating a reference image C 98 is set to refIdxL0C and a motion vector is set to mvL0C. The lateral direction component and the longitudinal direction component of the motion vector mvL0C are set to mvL0C_x and mvL0C_y, respectively. An image processing method (a method of determining reference index) according to the second embodiment is described below with the example depicted in FIG. 6 by using the above notations of the reference indexes and the motion vectors. The index number is assigned in the same manner as that depicted in FIG. 9.

Figure 7:
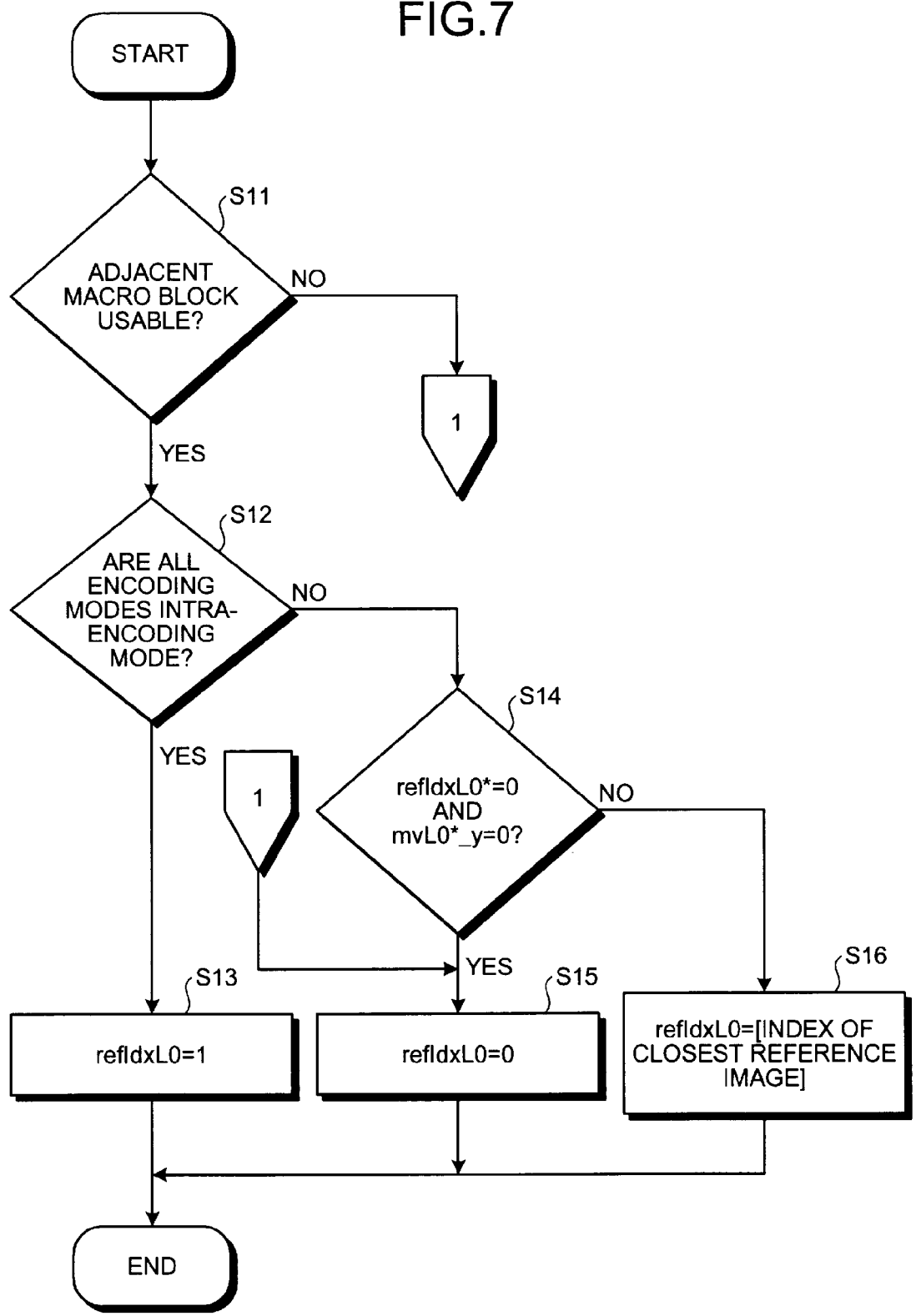
FIG. 7 is a flowchart depicting the image processing method according to the second embodiment.

FIG. 7 is a flowchart depicting the image processing method according to the second embodiment. As depicted in FIG. 7, when image processing for a processing target block is started, the motion-vector determining unit 32 determines whether information as the adjacent macro block exists in at least one among the left macro block A 92, the upper macro block B 93, and the right macro block C 94. That is, the motion-vector determining unit 32 determines whether at least one adjacent macro block is usable (step S11).

When there is no macro block that can be used as an adjacent macro block (step S11: NO), the motion-vector determining unit 32 determines that the encoding-target macro block 91 belongs to a quiescence area. Based on this determination, the reference-index determining unit 33 determines refIdxL0 to be "0" (step S15). This causes the closest image identical in parity with respect to the encoding-target macro block 91 to be selected as the reference image 95 to be obtained for the encoding-target macro block 91. With this operation, a series of processes for the encoding-target macro block 91 is completed. An example of a case where there is no usable adjacent macro block includes a case where the encoding-target macro block 91 is located in the boundary portion of a picture or the boundary portion of a slice.

On the other hand, when any one of the macro blocks can be used as an adjacent macro block (step S11: YES), the intra-mode determining unit 31 determines whether the encoding mode of the usable adjacent macro block is the intra-encoding mode. When there are multiple usable adjacent macro blocks, the intra-mode determining unit 31 determines whether all encoding modes of the usable adjacent macro blocks are the intra-encoding mode (step S12).

If all the encoding modes of the usable adjacent macro blocks are determined to be the intra-encoding mode (step S12: YES), the reference-index determining unit 33 determines refIdxL0 to be "1" (step S13). This causes the closest image differing in parity with respect to the encoding-target macro block 91 to be selected as the reference image 95 to be obtained for the encoding-target macro block 91. With this operation, a series of processes for the encoding-target macro block 91 is completed. An example of a case where all the encoding modes of the usable adjacent macro blocks are the intra-encoding mode includes a case where an occlusion is generated due to a movement of an object. In this case, as the encoding-target macro block 91 can be regarded to belong to the moving area, the selection of the closest image differing in parity increases the prediction efficiency.

If the encoding mode of at least one of the usable adjacent macro blocks is determined to not be the intra-encoding mode, that is, is determined to be the inter-encoding mode (step S12: NO), the motion-vector determining unit 32 determines whether the encoding-target macro block 91 belongs to a quiescence area (step S14). For example, the left macro block A 92, the upper macro block B 93, and the right macro block C 94 are assumed to be usable adjacent macro blocks in the inter-encoding mode. In this case, when conditions (3), (4), and (5) are satisfied, it is determined that the encoding-target macro block 91 belongs to a quiescence area (step S14). Alternatively, even when all the conditions (3), (4), and (5) are not satisfied, if any one of or a combination of two or more of the conditions is satisfied, it may be determined that the encoding-target macro block 91 belongs to a quiescence area. The symbol "*" at step S14 in FIG. 7 represents A, B, or C. In addition, in the notation of step S14 in FIG. 7, the lateral direction component (x component) of the motion vector is omitted.

$$\text{refIdxL0A}=0 \text{ and } mvL0A\_x=mvL0A\_y=0 \quad (3)$$

$$\text{refIdxL0B}=0 \text{ and } mvL0B\_x=mvL0B\_y=0 \quad (4)$$

$$\text{refIdxL0C}=0 \text{ and } mvL0C\_x=mvL0C\_y=0 \quad (5)$$

Instead of determining whether the lateral direction component and the longitudinal direction component of the motion vector are "0", the determination may be performed in the following manner by using an absolute value of the lateral direction component and an absolute value of the longitudinal direction component. A threshold value THx and a threshold value THy are set in advance for the lateral direction component and the longitudinal direction component of the motion vector, and when conditions (6) and (7) are satisfied, the motion vector may be regarded as substantially "0". Alternatively, a threshold value TH is set in advance for a sum of the absolute value of the lateral direction component and the absolute value of the longitudinal direction component of the motion vector, and when condition (8) is satisfied, the motion vector may be regarded as substantially "0". In the notation of the conditions (6), (7), and (8), the symbol "*" represents A, B, or C.

$$|mvL0*\_x|<THx \quad (6)$$

$$|mvL0*\_y|<THy \quad (7)$$

$$|mvL0*\_x|+|mvL0*\_y|<TH \quad (8)$$

In addition, in the case of the interlacing method, the top field and the bottom field are located on the spatially different sides of upper and lower sides. Therefore, in the conditions (3) to (8) mentioned above, the lateral direction component (x component) of the motion vector may be omitted from the criteria for the determination.

When it is determined that the encoding-target macro block 91 belongs to a quiescence area (step S14: YES), the reference-index determining unit 33 determines refIdxL0 to be "0" (step S15). This causes the closest image identical in parity with respect to the encoding-target macro block 91 to be selected as the reference image 95 to be obtained for the encoding-target macro block 91. With this operation, a series of processes for the encoding-target macro block 91 is completed. When the encoding-target macro block 91 belongs to a quiescence area, there is virtually no change of the picture between the encoding-target macro block 91 and the closest image identical in parity. Therefore, the selection of the closest image identical in parity increases the prediction efficiency.

If the above conditions for determining that the encoding-target macro block belongs to the quiescence area are not satisfied, it is determined that the encoding-target macro block 91 belongs to the moving area (step S14: NO). In this case, the reference-index determining unit 33 determines refIdxL0 in the following manner with adjacent macro blocks that are determined to be usable at step S11 and for which the encoding modes have been determined to be the inter-encoding mode at step S12.

For example, the left macro block A 92, the upper macro block B 93, and the right macro block C 94 are assumed to the usable adjacent macro blocks in the inter-encoding mode. Since the index number is assigned in the same manner as that depicted in FIG. 9, the priority order for refIdxL0 is 1, 0, 3, and 2. Therefore, refIdxL0 is determined according to conditions (9) to (12) (step S16).

$$\text{In a case where any one of refIdxL0A, refIdxL0B, and refIdxL0C is "1", refIdxL0}=1. \quad (9)$$

$$\text{In a case where (9) is not satisfied and any one of refIdxL0A, refIdxL0B and refIdxL0C is "0", refIdxL0}=0. \quad (10)$$

$$\text{In a case where (10) is not satisfied and any one of refIdxL0A, refIdxL0B and refIdxL0C is "3", refIdxL0}=3. \quad (11)$$

$$\text{In a case where (11) is not satisfied and any one of refIdxL0A, refIdxL0B and refIdxL0C is "2", refIdxL0}=2. \quad (12)$$

Thus, a series of processes for one encoding-target macro block 91 is completed. The processes described above are performed for all of the encoding-target macro blocks 91.

When there is an adjacent macro block in the inter-encoding mode and the encoding-target macro block 91 belongs to a moving area, the prediction is likely to be incorrect since temporal deviation between the encoding-target macro block 91 and the reference image increases. Therefore, regardless of whether the parity is the same, the selection of the closest image increases the prediction efficiency.

According to the second embodiment, in the encoding apparatus, the reference index of the encoding-target macro block 91 is determined based on the encoding modes, the motion vectors, and the reference indexes of the encoded adjacent macro blocks adjacent to the encoding-target macro block 91. Also in the decoding apparatus, when decoding a bit stream of the image data output from the encoding apparatus, if a reference index of a decoding-target macro block to be decoded is determined in the same manner as that in the encoding apparatus, the reference index need not be notified from the encoding apparatus to the decoding apparatus. Therefore, in the same manner as the first embodiment, it is possible to encode more macro blocks without including the reference index, whereby the encoding efficiency is increased.

In a third embodiment, the image processing apparatus and the image processing method according to the first embodiment are applied to a decoding apparatus and a decoding method for a moving image. A moving-image decoding system to which the third embodiment can be applied includes ITU-T H.264/ISO/IEC MPEG-4 AVC or ISO/IEC MPEG-2/MPEG-4, for example. The hardware configuration of the decoding apparatus according to the third embodiment is the same as the configuration depicted in FIG. 3, and thus description thereof will be omitted.

Figure 8:
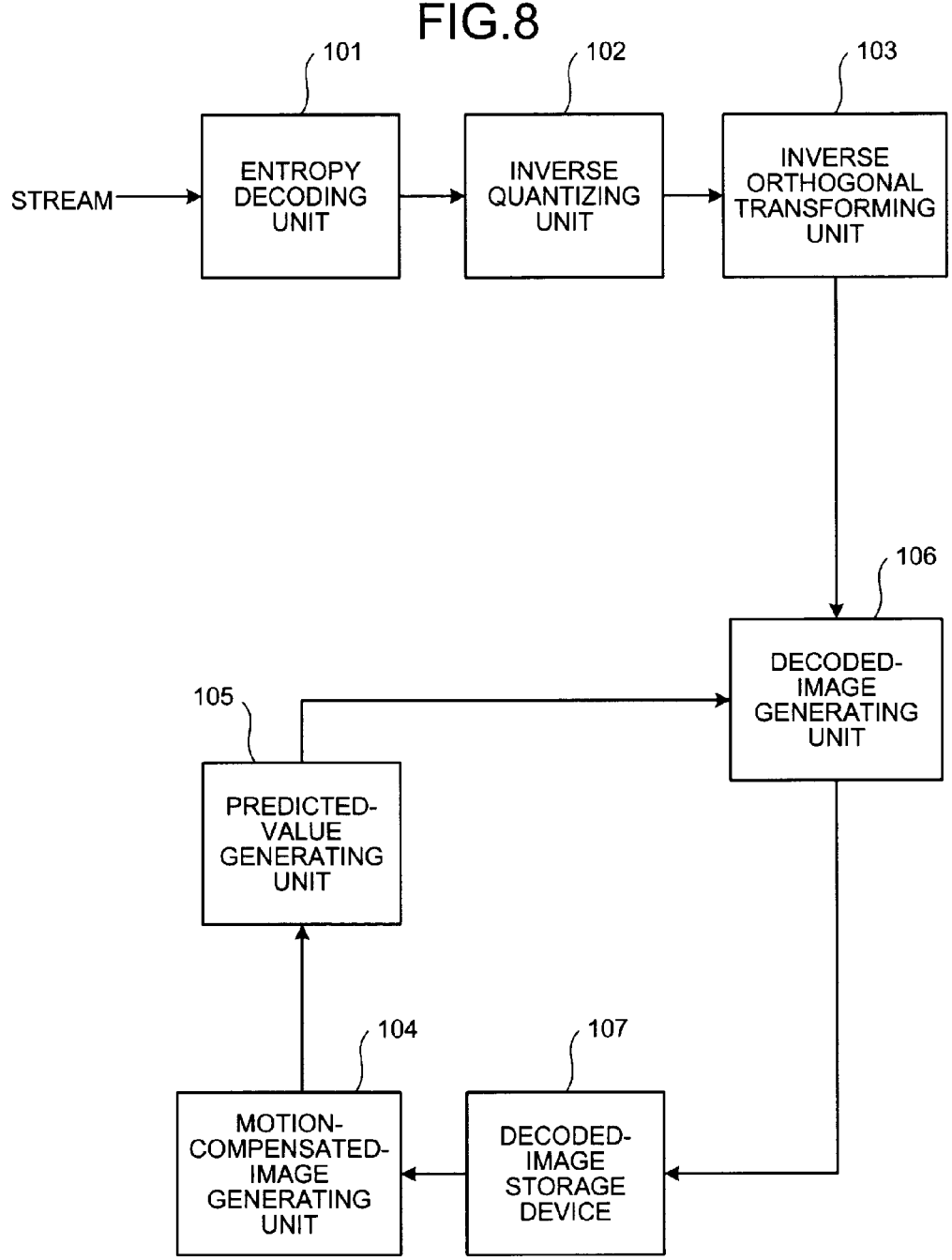
FIG. 8 is a block diagram depicting a functional configuration of a decoding apparatus according to a third embodiment.

FIG. 8 is a block diagram depicting a functional configuration of a decoding apparatus to which an image processing apparatus according to the third embodiment is applied. As depicted in FIG. 8, the decoding apparatus includes an entropy decoding unit 101 as a decoding unit, an inverse quantizing unit 102, an inverse orthogonal transforming unit 103, a motion-compensated-image generating unit 104, a predicted-value generating unit 105, a decoded-image generating unit 106, and a decoded-image storage device 107. In the same manner as the second embodiment, a decoding process is performed in units of macro blocks of, for example, 16×16 pixels for each decoding target field. For example, the decoding apparatus decodes information encoded by the encoding apparatus according to the second embodiment to reproduce an image.

The entropy decoding unit 101 generates differential information and a motion vector by decoding encoded information of the input stream. The inverse quantizing unit 102 performs an inverse quantization process with respect to the differential information generated by the entropy decoding unit 101. The inverse orthogonal transforming unit 103 performs an inverse orthogonal transform process with respect to an output signal of the inverse quantizing unit 102. The predicted-error signal is reproduced by performing corresponding inverse processes of, for example, the orthogonal transforming unit 62, the quantizing unit 63, the entropy encoding unit 64 according to the second embodiment (see FIG. 4) by the entropy decoding unit 101, the inverse quantizing unit 102, and the inverse orthogonal transforming unit 103, respectively.

For example, the motion-compensated-image generating unit 104 includes an image processing apparatus having the same configuration as that depicted in FIG. 5. For example, as described in the second embodiment, the image processing apparatus depicted in FIG. 5 determines the reference index when decoding a decoding-target macro block, based on an encoding mode, a motion vector, and a reference index of an adjacent macro block adjacent to the decoding-target macro block. The motion-compensated-image generating unit 104 reads a reference image corresponding to the determined reference index from the decoded-image storage device 107, and generates a motion-compensated image signal based on the reference image and a motion vector notified from the input stream. The predicted-value generating unit 105 generates a predicted signal representing a predicted value of a decoded image, based on the motion-compensated image signal generated by the motion-compensated-image generating unit 104. The motion-compensated-image generating unit 104 and the predicted-value generating unit 105 generate the predicted signal in the same manner as the motion-vector calculating unit 71 and the inter-predicted-image generating unit 70 according to the second embodiment (see FIG. 4).

The decoded-image generating unit 106 generates the decoded image by, for example, adding the predicted signal generated by the predicted-value generating unit 105 and the reproduced predicted-error signal. The decoded-image storage device 107 stores therein data of the generated decoded image. The data of the decoded image stored in the decoded-image storage device 107 is used as a reference image when performing a subsequent decoding process. For example, the decoded-image storage device 107 includes a frame memory, and is implemented by, for example, the RAM 43 in the hardware configuration depicted in FIG. 3. Other constituent elements of the decoding apparatus except for the decoded-image storage device 107 are implemented by, for example, the image processor 42 reading the image processing program from the HDD 44 and performing the image processing in the hardware configuration depicted in FIG. 3. The procedure of determining the reference index in the image processing method according to the third embodiment is the same as that of the second embodiment, and thus description thereof will be omitted.

According to the third embodiment, in the decoding apparatus, the reference index of the decoding-target macro block is determined based on the encoding mode, the motion vector, and the reference index of an adjacent macro block. Also in the encoding apparatus, if a reference index of an encoding-target macro block is determined in the same manner as that in the decoding apparatus, the reference index need not be notified from the encoding apparatus to the decoding apparatus. Therefore, in the same manner as the first embodiment, it is possible to increase the encoding efficiency by using the decoding apparatus described above and the encoding apparatus that determines the reference index of the encoding-target macro block in the same manner as the decoding apparatus.

The image processing apparatus and the image processing method according to the present invention disclosed in the present invention can improve the encoding efficiency in image processing of a moving image.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus that divides a frame into multiple fields each displayed at a different timing, divides an image of each field into multiple blocks, and performs motion compensating prediction based on a reference image selected for each block and from among a plurality of candidate reference images that are past reference images and a motion vector with respect to the reference image, the image processing apparatus comprising a processor that is configured to:
   determine whether all encoding modes of a plurality of adjacent blocks adjacent to a processing target block to be processed are an intra-encoding mode,
   determine upon determining that the encoding mode of at least one of the adjacent blocks is not the intra-encoding mode, whether the processing target block belongs to a quiescence area or a moving area, based on a motion vector of the adjacent block for which the encoding mode has been determined to not be the intra-encoding mode and a reference index indicating a reference image of the adjacent block for which the encoding mode has been determined to not be the intra-encoding mode, and
   select upon determining that all the encoding modes of the adjacent blocks are the intra-encoding mode, an index number assigned to an image that is temporally closest and in a field different from a field to which the processing target block belongs, select upon determining that the processing target block belongs to a quiescence area, an index number assigned to an image that is temporally closest and in a same field as the field to which the processing target block belongs, select upon determining that the processing target block belongs to a moving area and from among reference indexes indicating reference images of the adjacent blocks for which the encoding modes have been determined to not be the intra-encoding mode, an index number of a reference image that is temporally closest, and determine the selected index number as a reference index indicating a reference image of the processing target block.

2. The image processing apparatus according to claim 1, wherein
   positions of the fields, in a longitudinal direction in a picture, differ, and
   the processor determines whether the processing target block belongs to a quiescence area or a moving area, based on a longitudinal direction component of the motion vector of the adjacent block for which the encoding mode has been determined to not be the intra-encoding mode.

3. The image processing apparatus according to claim 1, wherein the processor determines that the processing target block belongs to a quiescence area when there is no information on the adjacent block.

4. The image processing apparatus according to claim 1, the processor configured to:
   generate a predicted image of the processing target block based on the determined reference index, a reference image corresponding to the reference index, and a motion vector of the processing target block with respect to the reference image,
   generate an error of a predicted image of the processing target block with respect to an original image of the processing target block,
   perform an orthogonal transform of the generated error,
   perform quantization of an output signal resulting from the orthogonal transform, and
   encode the motion vector of the processing target block with respect to the reference image and an output signal resulting from the quantization.

5. The image processing apparatus according to claim 4, the processor configured to:
   perform inverse quantization of the output signal resulting from the quantization,
   reproduce the error of the predicted image by performing an inverse orthogonal transform of an output signal resulting from the inverse quantization, and
   generate a decoded image of the processing target block based on the reproduced error of the predicted image and the generated predicted image.

6. The image processing apparatus according to claim 1, the processor configured to:
   perform decoding of encoded information in which information on an error of a predicted image of the processing target block and a motion vector of the processing target block is encoded,
   perform inverse quantization of an output signal resulting from the decoding,
   reproduce an error of the predicted image of the processing target block by performing an inverse orthogonal transform of an output signal resulting from the inverse quantization,
   generate a motion compensated image of the processing target block based on the determined reference index, a reference image corresponding to the reference index, and a motion vector of the processing target block with respect to the reference image,
   generate a predicted value of a decoded image of the processing target block based on the generated motion compensated image of the processing target block, and
   generate the decoded image of the processing target block based on the reproduced error of the predicted image and the generated predicted value of the decoded image.

7. An image processing method of dividing a frame into multiple fields each displayed at a different timing, dividing an image of each field into multiple blocks, and performing motion compensating prediction based on a reference image selected for each block and from among a plurality of candidate reference images that are past reference images and a motion vector with respect to the reference image, the image processing method comprising:
   determining whether all encoding modes of a plurality of adjacent blocks adjacent to a processing target block to be processed are an intra-encoding mode;
   selecting as a reference index indicating a reference image of the processing target block and upon determining that all the encoding modes of the adjacent blocks are the intra-encoding mode, an index number assigned to an image that is temporally closest and in a field different from a field to which the processing target block belongs;
   determining upon determining that the encoding mode of at least one of the adjacent blocks is not the intra-encoding mode, whether the processing target block belongs to a quiescence area or a moving area, based on a motion vector of the adjacent block for which the encoding mode has been determined to not be the intra-encoding mode and a reference index indicating a reference image of the adjacent block for which the encoding mode has been determined to not be the intra-encoding mode;
   selecting as the reference index indicating the reference image of the processing target block and upon determining that the processing target block belongs to a quiescence area, an index number assigned to an image that is temporally closest and in a same field as the field to which the processing target block belongs; and selecting as the reference index indicating the reference image of the processing target block and upon determining that the processing target block belongs to a moving area, an index number of a reference image that is temporally closest, the index number being selected from among reference indexes indicating reference images of the adjacent blocks for which the encoding modes have been determined to not be the intra-encoding mode.

8. The image processing method according to claim 7, wherein positions of the fields, in a longitudinal direction in a picture, differ, and the determining whether the processing target block belongs to a quiescence area or a moving area is based on a longitudinal direction component of the motion vector of the adjacent block for which the encoding mode has been determined to not be the intra-encoding mode.

9. The image processing method according to claim 7, further comprising determining that the processing target block belongs to a quiescence area when there is no information on the adjacent block.

\* \* \* \* \*